United States Patent

Kaniwa et al.

[11] Patent Number: 5,808,824
[45] Date of Patent: Sep. 15, 1998

[54] TAPE FEED CONTROL SYSTEM

[75] Inventors: Kouji Kaniwa, Kanagawa-ken; Kouji Fujita, Yokohama; Shigemitsu Higuchi, Fujisawa; Nobuyuki Kaku, Kanagawa-ken, all of Japan

[73] Assignee: Hitachi, Ltd., Tokyo, Japan

[21] Appl. No.: 568,433

[22] Filed: Dec. 6, 1995

[30] Foreign Application Priority Data

Dec. 19, 1994 [JP] Japan .................................. 6-314870

[51] Int. Cl.⁶ .................................................. G11B 15/43
[52] U.S. Cl. ........................ 360/71; 360/73.14; 360/74.3; 242/334
[58] Field of Search .............................. 360/71, 95, 74.2, 360/72.3, 73.14, 137; 242/333.5, 333.6, 333.7, 334, 334.4, 334.5, 334.6

[56] References Cited

U.S. PATENT DOCUMENTS

| Re. 30,939 | 5/1982 | D'Alayer De Costemore D'Arc et al. ................................................. 242/334.4 X |
|---|---|---|
| 4,232,371 | 11/1980 | Kamoto .................................. 364/561 |
| 4,338,645 | 7/1982 | Mohri et al. ...................... 242/333.7 X |
| 4,347,538 | 8/1982 | Klank ................................ 360/72.3 X |
| 4,644,436 | 2/1987 | Unno .................................... 360/72.3 |
| 4,786,992 | 11/1988 | Tajima et al. .................... 360/73.04 X |
| 5,039,027 | 8/1991 | Yanagihara et al. .................. 360/71 X |
| 5,220,477 | 6/1993 | Sorihashi et al. ........................ 360/71 |
| 5,222,684 | 6/1993 | Yoneda et al. ....................... 360/71 X |
| 5,259,563 | 11/1993 | Kakiwaki et al. ............... 360/73.14 X |
| 5,540,398 | 7/1996 | Nishida et al. ...................... 360/71 X |
| 5,701,214 | 12/1997 | Inoue et al. .............................. 360/71 |

FOREIGN PATENT DOCUMENTS

| 61-198460 | 9/1986 | Japan . |
| 2-301053 | 12/1990 | Japan . |
| 4-307449 | 10/1992 | Japan . |
| WO 95/16991 | 6/1995 | WIPO .................................. 360/72.3 |

Primary Examiner—Aristotelis M. Psitos
Assistant Examiner—James L. Habermehl
Attorney, Agent, or Firm—Antonelli, Terry, Stout & Kraus, LLP

[57] ABSTRACT

A capstanless tape feed control system of a reel-drive type is capable of accurately detecting the respective working radii of a supply reel and a take-up reel and the total length of the tape, of efficiently controlling tape speed and of preventing damage to the tape. The tape feed control system calculates the working radii of the supply reel and the take-up reel and the total length of the tape while the leading end of the tape is moving toward the take-up reel, and detects tape speed on the basis of data representing the total length of the tape and the radius ratio between the supply reel and the take-up reel. The tension of the tape and the reel driving torque are detected while the tape is being fed and the working radii of the supply reel and the take-up reel are calculated on the basis of the tension and the reel driving torque. A tape loading operation and a tape unloading operation are performed after the leading end of the tape has been pulled out from the take-up reel, with the supply reel being held stationary and a predetermined back tension being applied to the tape by the take-up reel.

9 Claims, 6 Drawing Sheets

TAPE FEED CONTROL SYSTEM

BACKGROUND OF THE INVENTION

The present invention relates to a tape feed control system for use in combination with a data recorder for recording and reproducing digital data and, more specifically, to a tape feed control system that causes a tape to travel directly between a supply reel and a take-up reel.

Data recorders employing a helical-scan magnetic recording/reproducing apparatus using a tape cassette, such as digital audio tapes (DAT) and an 8 mm video tape cassette, have been used as external storage apparatus for computers and the like in recent years. The helical-scan data recorder, as compared with a fixed-head data recorder, is capable of operating at a high transfer rate and has a large storage capacity. Generally, data recorders are provided with a reel motor to feed the tape at an increased feed speed to improve the ability for random access and the operability thereof. Such data recorders feed a tape using a capstan motor to control the tape speed with a high accuracy, when the tape needs to be fed at a low tape speed for recording or reproducing, and the tape is driven directly by a supply reel motor and a take-up reel motor, when the tape needs to be fed at a high tape speed for versing-up or rewinding. The reel motors are used for exerting a back tension on the tape, as well as for driving the tape for high-speed feed.

When feeding the tape using a capstan motor, the tape is nipped between a capstan connected to the capstan motor and a pinch roller pressed against the capstan. Since the radius of the capstan is known, the tape speed is controlled with a high accuracy by controlling the rotating speed of the capstan motor for constant-speed operation. When controlling the speed of the tape driven by the supply reel and the take-up reel, the tape speed cannot be regulated at a fixed tape speed by controlling the rotating speeds of the reels because the working radii of the reels vary continuously.

A system for controlling tape speed through control of the rotating speed of a reel, as disclosed in Japanese Patent Laid-Open No. Hei 4-307449 (1992), detects the working radius of the reel continuously and regulates the product of the working radius of the reel and the rotating speed of the same to a fixed value. Systems disclosed in Japanese Patent Laid-Open Nos. Hei 2-301053 (1990) and Sho 61-198460 (1986) control the rotating speeds of reels so that the sum of the respective squares of the rotational periods of the reels is constant, based on the fact that the total length of a tape contained in a tape cassette loaded into the tape operating device, i.e., the sum of the length of the tape on the supply reel and that of the tape on the take-up reel, is fixed regardless of tape speed. Although these two systems of controlling tape speed through the control of the rotating speeds of the reels use different methods of calculation, respectively, to determine tape speed on the basis of the total length of the tape and the rotational periods of the reels, these two systems are based on the same principle.

The prior art data recorder needs a tape feed system provided with a capstan motor for driving the capstan to feed the tape at a low speed with a high accuracy, and two reel motors for driving the reels to exert a back tension on the tape and to feed the tape at a high tape speed. The need to provide these three motors in the tape feed system is an impediment to the miniaturization of the data recorder and to the reduction of the costs of the data recorder.

Efforts have been made for the improvement of the data recorder to increase the recording capacity of the tape cassette without increasing the size of the tape cassette. These efforts are intended to increase the recording capacity by employing short-wave recording techniques and narrow-track recording techniques and by reducing the thickness of the tape contained in the tape cassette to increase the total length of the tape contained in the tape cassette. Tapes having a reduced thickness have a low rigidity and are liable to be damaged. Therefore, in an apparatus that nips the tape between a capstan and a pinch roller to feed the tape, the dimensional accuracies and the assembling accuracy of the capstan and the pinch roller must be increased, which increases the costs of the parts of the mechanical systems and the manufacturing costs of the apparatus.

SUMMARY OF THE INVENTION

Accordingly, it is an object of the present invention to provide an inexpensive tape feed control system to be incorporated into a data recorder provided with a helical-scan magnetic recording/reproducing system, which is capable of controlling tape speed by using a supply reel which are driven and a take-up reel in a wide tape speed range from a low tape speed to a high tape speed, and which is reliable in preventing damage to the tape and is satisfactory in operability.

First, the present invention provides a detecting device which is capable of quickly and accurately detecting the respective working radii of the supply reel and the take-up reel. Secondly, the present invention provides a damage preventing device which is capable of preventing damage to the thin tape when feeding the thin tape, loading the thin tape and unloading the thin tape. Thirdly, the present invention provides a protective device which is capable of protecting the tape and of quickly restoring the system to a normal condition when the tape feed control system is operated erroneously by the operator or when the tape feed control system is disconnected abnormally from the power source.

A tape feed control system in a first aspect of the present invention comprises a tape loading completion detecting means for detecting the completion of a tape loading operation; a supply reel stopping means for stopping the rotation of the supply reel when the completion of the tape loading operation is detected; a torque generating means for causing the take-up reel to generate a predetermined take-up torque when the completion of the tape loading operation is detected; a tape loading means for winding the tape around a drum; a rotational angle detecting means for detecting the respective angles of rotation of the supply reel and the take-up reel; take-up reel radius calculating means for calculating the working radius of the take-up reel on the basis of data representing the angle of rotation of the take-up reel and a predetermined loading path length; a tape rewinding means for rewinding the tape at a tape speed corresponding to the calculated working radius of the take-up reel; a leading end detecting means for detecting the leading end of the tape; a tape feed means for feeding an appropriate length of the tape from the supply reel to the take-up reel after the leading end of the tape has been detected; a total tape length calculating means for calculating numerical data relating to the total length of the tape on the basis of data representing the respective angles of rotation of the supply reel and the take-up reel detected by the rotational angle detecting means when the appropriate length of the tape is fed, and data representing the radius of the hub of the take-up reel; a rotational period detecting means for detecting the respective rotational periods of the supply reel and the take-up reel; a tape speed detecting means for detecting the tape speed on the basis of the data representing the total length of the tape and the data representing the respective rotational periods of the supply reel and the take-up reel; and a tape speed control means for feeding back the difference between the detected tape speed and a desired tape speed.

A tape feed control system in a second aspect of the present invention comprises, in addition to the components of the tape feed control system in the first aspect of the present invention, a tape tension detecting means disposed between the drum and the supply reel to detect the tension of the tape; and a tension storage means for storing tension data representing a tape tension detected at the start of a tape feeding operation for feeding the tape from the leading end of the tape. The tape feed control system uses data representing the angles of rotation detected by the rotational angle detecting means at a moment in which the appropriate length of the tape is fed and when the tension detected by the tape tension detecting means is equal to the tension represented by the tension data stored in the tension storage means.

A tape feed control system in a third aspect of the present invention comprises a tape tension detecting means disposed between a drum and a supply reel to detect the tension of the tape; a torque generating means for causing the supply reel to generate a predetermined winding torque; a supply reel radius calculating means for calculating the working radius of the supply reel using the tape tension data provided by the tension detecting means and torque data representing the torque generated by the supply reel by the torque generating means; a rotating speed/rotational period detecting means for detecting the rotating speed or the rotational period of the supply reel; a rotating speed/rotational period detecting means for detecting the rotating speed or the rotational period of the take-up reel; a radius ratio calculating means for calculating the radius ratio between the supply reel and the take-up reel on the basis of data representing the rotating speeds or the rotational periods provided by the two rotating speed/rotational period detecting means; and a take-up reel radius calculating means for calculating the working radius of the take-up reel on the basis of the supply reel radius data provided by the supply reel radius calculating means and the radius ratio data provided by the radius ratio calculating means.

In the foregoing and the following description, the following definition is submitted to avoid any possible misunderstanding of the terms, "supply reel" and "take-up reel." The term, "supply reel" designates a reel that feeds a tape in the forward direction, and the term, "take-up reel" designates a reel that takes up a tape traveling in the forward direction.

In the tape feed control system in the first aspect of the present invention, the tape loading completion detecting means detects whether or not a tape has been loaded into the apparatus and provides a tape loading start trigger signal upon detection of the loading of a tape. The supply reel stopping means holds the supply reel stationary so as to make it possible to pull out the tape from only the take-up reel when loading the tape. The torque generating means exerts a moderate back tension on the tape to prevent the tape from loosening and deviating from a correct path when loading the tape. The tape is unwound from only the take-up reel when loading the tape for the following reasons.

The data recorder records management data for managing the recorded data in a section near the leading end of the tape and, therefore, access to the leading end of the tape must be gained first for versing in recording data and reproducing data. Therefore, in the normal tape cassette loading operation and in the normal tape cassette ejecting operation, the tape is unwound leaving a length of the tape corresponding to a loading path length. When the tape is thus unwound, the working radius of the take-up reel is substantially equal to the radius of the hub of the take-up reel regardless of the length of the tape. Accordingly, the supply reel is held stationary, the tape is unwound only from the take-up reel when loading the tape, and the take-up reel is made to generate a fixed torque to exert a desired back tension on the tape during the tape loading operation so that the tape may not be damaged during the tape loading operation.

The tape loading means winds the tape around a drum mounted with a head. The rotational angle detecting means detects the respective angles of rotation of the supply reel and the take-up reel. The take-up reel radius calculating means calculates the working radius of the take-up reel on the basis of the angle of rotation through which the take-up reel is rotated for tape loading and the length of the tape unwound for tape loading. The tape rewinding means rewinds the tape at a substantially fixed tape speed so that the product of the calculated working radius and the rotating speed of the take-up reel is constant. The leading end detecting means detects an empty state of the take-up reel. The tape feed means feeds an appropriate length of the tape from the leading end in the forward direction. The total tape length calculating means calculates the working radius of the fully loaded supply reel on the basis of the data representing the respective angles of rotation of the supply reel and the take-up reel, and data representing the radius of the hub of the take-up reel, and calculates the total length of the tape on the basis of the data representing the respective working radii of the supply reel and the take-up reel.

The total tape length calculating means calculates the working radius of the supply reel with reference to a radius of a hub including a very small error and is capable of highly accurately calculating the total tape length. The rotational period detecting means detects the respective rotational periods of the supply reel and the take-up reel including information about the radius ratio between the supply reel and the take-up reel and information about tape speed during the tape feed operation. The tape speed detecting means detects the tape speed on the basis of the data representing the total tape length and the data representing the respective rotational periods of the supply reel and the take-up reel. The tape speed control means compares the detected tape speed and the predetermined desired tape speed, and feeds back the difference between the detected tape speed and the desired tape speed to the reel motor to regulate the tape speed at a fixed tape speed in a feedback control mode. Those actions of the components prevent damaging the tape when loading the tape, provide data accurately representing the respective radii of the supply reel and the take-up reel and the total tape length, and provide a highly accurate tape speed control operation.

The tape feed control system in the second aspect of the present invention, when the tape feed control system is provided with a most generally used tension sensor that varies the tape path length according to the tension of the tape, enables highly accurate calculation of data representing the radii of the reels and the total tape length. The tape path length is the physical length of a path along which the tape travels from the supply reel to the take-up reel. The tape tension detecting means detects the tape tension for feedback tension control. The tension storage means stores the tension data representing the tension of the tape detected at the start of feeding the tape from the leading end of the tape. The total tape length calculating means uses the data representing the respective angles of rotation of the supply reel and the take-up reel detected by the rotational angle detecting means after the appropriate length of the tape has been fed and at a moment when the tension of the tape detected by the tape tension detecting means is equal to the tension represented by the tension data stored in the tension storage means for calculating data representing the working radius of the fully loaded supply reel.

Since the working radius of the supply reel is calculated on an assumption that the length of the tape taken up by the take-up reel is equal to the length of the tape fed from the supply reel, the length of the tape taken up by the take-up reel differs from the length of the tape fed from the supply reel when the tape path length varies according to the variation of the tension, and hence accurate calculation is impossible. To solve such a problem, the calculation is carried out on the basis of data obtained when the length of the tape taken up by the take-up reel is equal to the length of the tape fed from the supply reel; that is, the data representing the angle of rotation of the supply reel and the data representing the angle of rotation of the take-up reel are obtained when the tension of the tape is equal to the tension represented by the tension data stored in the tension storage means so that the calculation will not be affected by the variation of the tape path length.

The tape feed control system in the third aspect of the present invention is capable of preventing damaging the tape in an unsteady state. The unsteady state is a state in which the data representing the radii of the reels or the total tape length is lost during the tape loading operation. The unsteady state occurs, for example, when the tape feed control system is disconnected accidentally during the tape loading operation due to a power failure or an operator's erroneous operation. If a tape unloading operation is started immediately after the reconnection of the tape feed control system to the power source, an appropriate back tension cannot be exerted on the tape because the respective radii of the reels are unknown, which is very likely to result in damage to the tape during the unloading operation. The third aspect of the present invention determines the respective radii of the reels and the total length of the tape without loading or unloading the tape when the data representing the radii of the reels or the total length of the tape is lost.

Therefore, in the third aspect of the present invention, the tape tension detecting means detects the tension of the tape, and the torque generating means causes the supply reel to generate a torque that urges the tape in the backward direction. The supply reel radius calculating means calculates the working radius of the supply reel by operating the tape tension data provided by the tape tension detecting means and torque data representing the torque generated by the supply reel made to generate the torque by the torque generating means. This calculation is based on the fact that the product of the tension of the tape tangentially acting on the reel and the working radius of the reel is equal to the driving torque of the reel. The radius ratio calculating means for calculating the radius ratio between the supply reel and the take-up reel determines the radius ratio on the basis of the data representing the respective rotating speeds or the respective rotational periods of the supply reel and the take-up reel which are provided by the rotating speed/rotational period detecting means. The working radius of the take-up reel is calculated on the basis of the radius ratio and the working radius of the supply reel.

Thus, the object of the present invention can be achieved by the foregoing configuration and actions.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
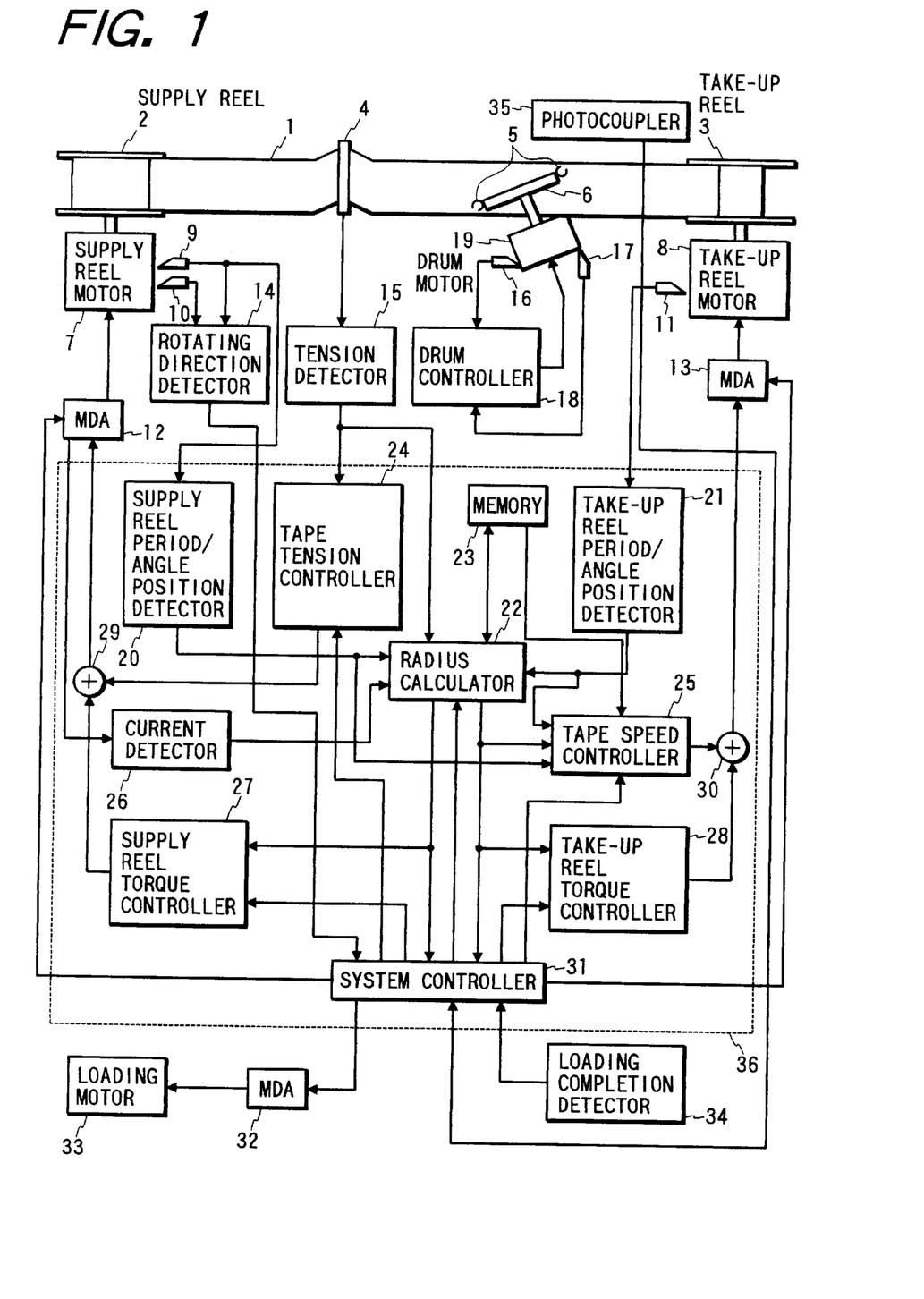
FIG. 1 is a block diagram of a tape feed control system in a preferred embodiment according to the present invention.

Referring to FIG. 1, which shows a tape feed control system forming a preferred embodiment according to the present invention, there are shown a magnetic tape 1, a supply reel 2, a take-up reel 3, a tape tension pickup 4 (pin), magnetic heads 5, a drum 6, a supply reel motor 7, a take-up reel motor 8, FG sensors 9 and 10 associated with the supply reel 2 (hereinafter referred to as "SFG sensors"), an FG sensor 11 associated with the take-up reel 3 (hereinafter referred to as "TFG sensor"), a supply reel motor driver/amplifier 12 (SMDA) for driving the reel motor 7, a take-up reel motor driver/amplifier 13 (TMDA) for driving the take-up reel motor 8, a rotating direction detector 14, a tension detector 15, an FG sensor 16 associated with the drum 6 (hereinafter referred to as "DFG sensor"), a PG sensor 17 associated with the drum 6 (hereinafter referred to as "DPG sensor"), a drum control circuit 18, a drum motor 19, a supply reel period/angle position detector 20 for detecting the rotational period and the angle of rotation of the supply reel 2, a take-up reel period/angle position detector 21 for detecting the rotational period and the angle of rotation of the take-up reel 3, a radius calculator 22, a memory 23, a tape tension controller 24, a tape speed controller 25, a current detector 26, a supply reel torque controller 27, a take-up reel torque controller 28, adders 29 and 30, a system controller 31, a loading motor 33, a motor driver/amplifier 32 (MDA) for driving the loading motor 33, a loading completion detector 34 and a photocoupler 35. The components in an area 36 demarcated by the dotted lines constitute a computer or the like.

Figure 2:
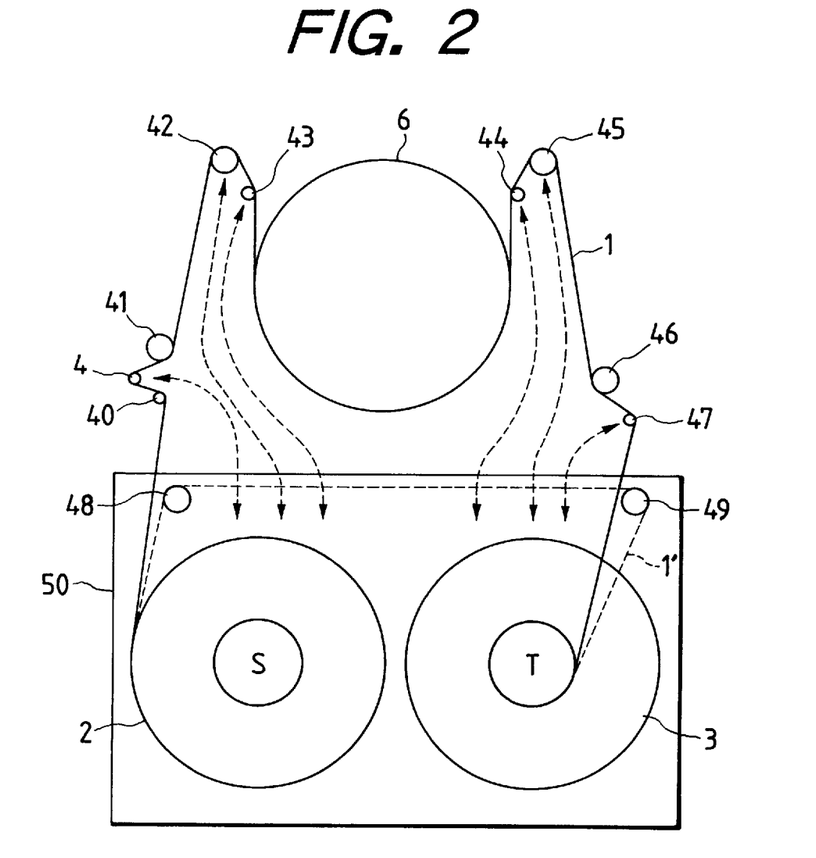
FIG. 2 is a diagrammatic plan view of an essential mechanism included in the tape feed control system of FIG. 1.

In FIG. 1, the tape feed control system is in a loaded state. FIG. 2 typically shows the mechanism of the tape feed control system in the loaded state in which the magnetic tape 1 threaded into the tape feed control system along a tape loading path. Shown in FIG. 2 are a tape cassette 50, guide pins 40, 43, 44 and 47 and guide rollers 41, 42, 45 and 46 defining a tape loading path, tape guides 48 and 49 included in the tape cassette 50, the magnetic tape 1, the supply reel 2, the take-up reel 3, the tape tension pickup 4 and the drum 6. When the cassette 50 is loaded into the tape feed control system, the tape 1 is extended between the supply reel 2 and the take-up reel 3 as indicated by dotted line 1', and the tension pickup 4, the guide rollers 42 and 45 and the guide pins 43 and 44 are received in the cassette 50 as indicated by dotted arrows in FIG. 2.

Operations including a cassette loading operation and a tape feed control operation will be described hereinafter with reference to FIGS. 1 and 3. First, operations to be executed in steps 2 to 7 of FIG. 3 will be described. Upon the detection of complete loading of the tape cassette 50, the loading completion detector 34 gives a loading completion signal to the system controller 31, and then the system controller 31 sends control signals to the relevant circuits to start a tape loading operation. The supply reel system executes a supply reel restraining control operation, in which the supply reel torque controller 27 gives a control signal to the SMDA 12 to make the supply reel motor 7 generate a predetermined torque. The supply reel motor 7 starts rotating, and the SFG sensors 9 and 10 generate frequency signals (SFG signals) proportional to the rotating speed of the supply reel motor 7. The SFG sensors 9 and 10 are disposed at slightly different positions, respectively, relative to the supply reel motor 7 so that the phase difference between the two SFG signals is about 90°. The two SFG signals are supplied to the rotating direction detector 14.

The rotating direction detector 14 detects the rotating direction of the supply reel motor 7 from the relation in phase between the two SFG signals, and supplies a rotating direction signal indicating the rotating direction of the supply reel motor 7 to the system controller 31. Then, the system controller 31 recognizes the rotating direction from the rotating direction signal and applies a reversing command to the SMDA 12. The reversing command does not require the reverse tape feed, but demands rotation in a rotating direction reverse to the rotating direction detected by the rotating direction detector 14. Consequently, the supply reel 2 is rotationally oscillated and is held substantially stationary. Since a torque that urges the supply reel 2 in the tape feed direction acts on the supply reel 2 when loading the tape 1, the supply reel torque controller 27 provides a control signal that makes the supply reel motor 7 generate a torque that urges the supply reel 2 in the winding direction to a greater extent than the torque urging the supply reel 2 in the feed direction.

On the other hand, the take-up reel system operates to exert a predetermined back tension on the tape 1. The back tension exerted on the tape 1 by the take-up reel 3 is dependent on a back tension control signal given by the take-up reel torque controller 28 to the TMDA1 3. Since it is assumed that the take-up reel 3 is virtually empty when loading the tape 1, the torque necessary for exerting the predetermined back tension on the tape 1 is equal to the product of the predetermined back tension and the working radius of the empty take-up reel 3, i.e., the radius of the hub of the take-up reel 3.

The system controller 31 carries out the supply reel restraining operation and the back tension control operation, and gives a drive control signal to the MDA 32, and then the MDA 32 provides a drive signal to drive the loading motor 33 for rotation. The rotation of the loading motor 33 is transmitted by a transmission mechanism to a mechanism for shifting the guide rollers and the guide pins as indicated by the arrows in FIG. 2 for a tape loading operation. The completion of the tape loading operation is detected by the loading completion detector 34.

Since the tape tension pickup 4 remains inoperative during the tape loading operation, the tape tension controller 24 does not provide any control signal, tape speed control is not executed and hence the tape speed controller 25 does not provide any control signal.

The angle of rotation of the take-up reel 3 during the tape loading operation, necessary for the calculation of the working radius of the take-up reel 3 at the completion of the tape loading operation, is measured by the TFG sensor 11 and the take-up reel period/angle detector 21. A TFG signal generated by the TFG sensor 11 is a frequency signal proportional to the rotating speed of the take-up reel motor 8 and has a number of pulses proportional to the angle of rotation of the motor 8. For example, when the TFG rate, i.e., the number of TFG pulses for each one turn of the take-up reel motor 8, is 720, half the measured TFG pulses is the angle (degree) of rotation. The take-up reel period/angle position detector 21 counts the number of pulses of the TFG signal and gives data representing the angle of rotation of the take-up reel 3 during the tape loading operation to the radius calculator 22. The radius calculator 22 calculates the working radius of the take-up reel 3 at the completion of the tape loading operation according to a mode control signal given thereto by the system controller 31.

The working radius of the take-up reel 3 is calculated by using:

$$Rt = \frac{Ltp}{NTFG} \qquad (1)$$

where Rt (mm) is the working radius of the take-up reel 3, Ltp (mm) is the difference between a path length of the tape 1 indicated by a continuous line and a path length of the tape 1' indicated by the dotted line in FIG. 2, and NTFG (rad) is the angle of rotation of the take-up reel 3 during the tape loading operation. The completion of the tape loading operation is detected by the loading completion detector 34.

Steps 8 to 15 shown in FIG. 3 will be described hereinafter. The working radius Rt of the take-up reel 3 calculated by the foregoing procedure is supplied to the system controller 31. The system controller 31 compares the working radius Rt with a predetermined reference radius Rtref. If Rt>Rtref, the system controller 31 decides that the length of the tape 1 on the take-up reel is greater than a predetermined length and provides control signals to the relevant components to execute operations in steps 10 to 15 of FIG. 3 for rewinding the tape 1. If Rt≦Rtref, operations in steps 16 to 23 of FIG. 3 are executed.

Figure 3:
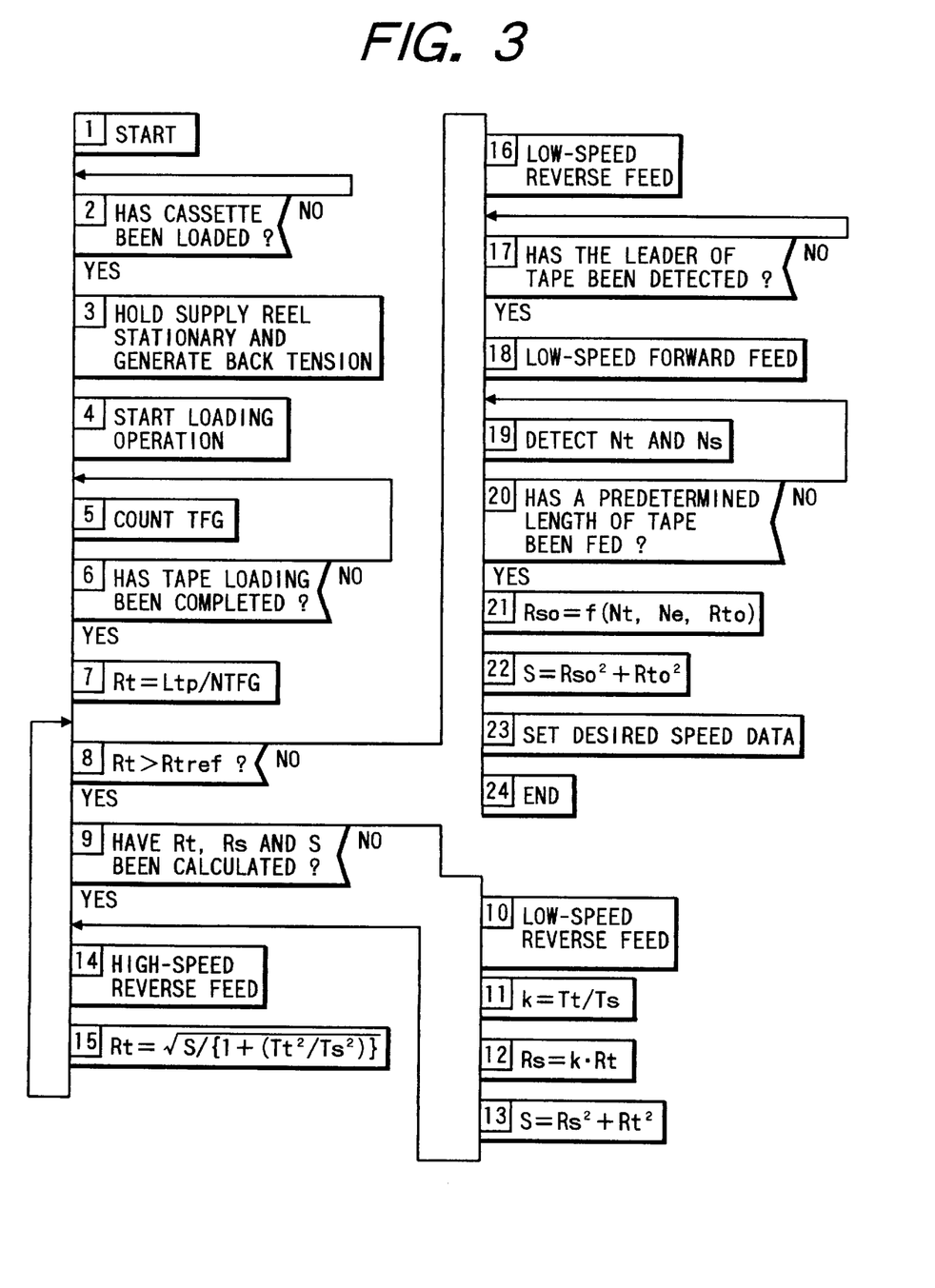
FIG. 3 is a flow chart of the operations of the tape feed control system of FIG. 1 and signal processing procedures (PAD diagram)

In steps 10 to 15 of FIG. 3, the working radius Rs of the supply reel 2 and the total length S of the tape 1 are calculated for quick reverse tape feed, in which the tape 1 is reversed at a high tape speed. When the working radii Rt and Rs and the total length S of the tape 1 are known (step 9), a high-speed reverse tape feed operation is started immediately. The working radius Rs of the supply reel 2 can be determined on the basis of the rotational period ratio or the rotation angle ratio between the supply reel 2 and the take-up reel 3 when the tape 1 is fed. The tape is reversed at a low tape speed. Since the working radius Rs of the supply reel 2 and the total length S of the tape 1 are not known at this moment, the tape speed and the tension cannot be accurately controlled and, therefore, the tape 1 is reversed at a low tape speed. This low-speed reverse tape feed is necessary for determining the rotational period ratio or the rotation angle ratio between the supply reel 2 and the take-up reel 3. Therefore, the tape speed controller 25 controls the take-up reel 3 for rotation at a fixed rotational period. The tension controller 24 controls the supply reel motor 7 in a feedback control mode so that the tension of the tape 1 detected by the tension detector 15 coincides with a predetermined value.

Data representing the respective rotational periods or the respective angles of rotation of the supply reel 2 and the take-up reel 3 is obtained by the period/angle detectors 20 and 21 and is applied to the radius calculator 22. The radius calculator 22 calculates the working radius Rs of the supply reel 2 by using:

$$k = \frac{Tt}{Ts} \qquad (2)$$

$$Rs = k \cdot Rt \qquad (3)$$

where Tt is the rotational period of the take-up reel 3, Ts is the rotational period of the supply reel 2, k is the rotational period ratio, which is equivalent to the radius ratio, and Rt is the working radius of the take-up reel 3.

The total length S of the tape 1, which is a reference value dominating the tape feed control operation using the reels, is calculated by using:

$$S = Rs^2 + Rt^2 \qquad (4)$$

where Rs is the working radius of the supply reel 2 and Rt is the working radius of the take-up reel 3. The calculated total length S is stored in the memory 23.

The relation between the total length S of the tape 1, the tape feed speed V, the working radius Rs of the supply reel 2 and the working radius Rt of the take-up up reel 3 will be explained hereinafter. The tape feed speed V is expressed by:

$$V = \sqrt{\frac{4\pi S}{Ts^2 + Tt^2}} \qquad (5)$$

and the respective working radii Rs and Rt of the supply reel 2 and the take-up reel 3 are expressed by:

$$Rt = \sqrt{\frac{S}{1 + \frac{Ts^2}{Tt}}} \quad Rs = \sqrt{\frac{S}{1 + \frac{Ts^2}{Tt}}} \qquad (6)$$

The tape speed controller 25 calculates the tape feed speed V by using the total length S of the tape 1 stored in the memory 23, and the data representing the respective rotational periods Ts and Tt of the supply reel 2 and the take-up reel 3 and provided by the period/angle detectors 20 and 21. The same data is used by the radius calculator 22 for calculating the respective working radii Rs and Rt of the supply reel 2 and the take-up reel 3. Thus, the tape feed speed V and the working radii Rs and Rt are determined. This data enables a high-speed reverse feed operation, and the tape 1 is rewound until the working radius Rt of the take-up reel 3 decreases to below the reference radius Rtref. Upon the detection of a decrease of the working radius Rt of the take-up reel 3 to below the reference radius Rtref, the system controller 31 provides control signals to relevant components to execute operations in steps 16 to 23 of FIG. 3.

In the reverse feed operation in step 16 and the following steps of FIG. 3, the tape 1 is rewound. The photocoupler 35 (FIG. 1) detects the leading end of the tape 1. The photocoupler 35 has a light-emitting device and a light-sensitive device disposed on the opposite sides, respectively, of the tape 1, and detects a transparent leader tape in the leading end of the tape 1. The tape 1 is fed forward after the leading end of the tape 1 has been detected at a low feed speed to calculate the total length S of the tape 1 accurately. During the low-speed forward feed operation, the take-up reel 3 is controlled so as to rotate at a fixed rotating speed. The period/angle position detectors 20 and 21 detect the number of turns (=(angle of rotation)/360°) of the supply reel 2 and the take-up reel 3 during the low-speed forward feed operation and give data representing the number of turns to the radius calculator 22. After a predetermined length Lref of the tape 1 has been fed forward, the full working radius $Rs_0$, i.e., the working radius of the full supply reel 2, is calculated by using:

$$Rs_0 = \frac{nt}{ns} Rt_0 + \frac{Td}{ns} \frac{nt^2 + ns^2 - ns}{2} \qquad (7)$$

where ns is the number of turns of the supply reel 2, nt is the number of turns of the take-up reel 3, and Td is the thickness of the tape 1.

Then, the total length S of the tape 1 is calculated on the basis of the working radius $Rt_0$ of the empty take-up reel 3, i.e., the radius of the hub of the take-up reel 3, and the working radius $Rs_0$ of the full supply reel 2 by using:

$$S = Rt_0^2 + Rs_0^2 \qquad (8)$$

Since the working radius $Rt_0$ of the empty take-up reel 3 is substantially equal to the radius of the accurately formed hub of the take-up reel 3, the total length S can be accurately calculated. Since the expression (7) for calculating the working radius $Rs_0$ of the full supply reel 2 does not include any term representing the length of the tape 1 fed for determining the total length S, the management of the length of the tape fed for the calculation of the total length S may be simple. Although tapes contained in cassettes which differ from each other in recording capacity have different thicknesses, the thickness of the tape 1 can be known from the recognition hole of the cassette. Therefore, an accurate thickness Td is used for accurately calculating the working radius $Rs_0$ of the full supply reel 2.

Data representing a desired speed is set in step 23 of FIG. 3 for regulating the sum of the respective squares of the rotational periods of the supply reel 2 and the take-up reel 3 at a fixed value when it is difficult, in view of the processing ability of the tape feed control system, to execute the speed detecting calculation using expression (5) continuously for tape speed control. The desired speed data for the sum of the respective squares of the rotational periods of the supply reel 2 and the take-up reel 3 is calculated by using:

$$Ts^2 + Tt^2 = \frac{4\pi S}{V_0^2} \qquad (9)$$

The desired speed data calculating operation need be executed only once after the total length S of the tape 1 has been determined, which reduces the signal processing load.

Figure 4:
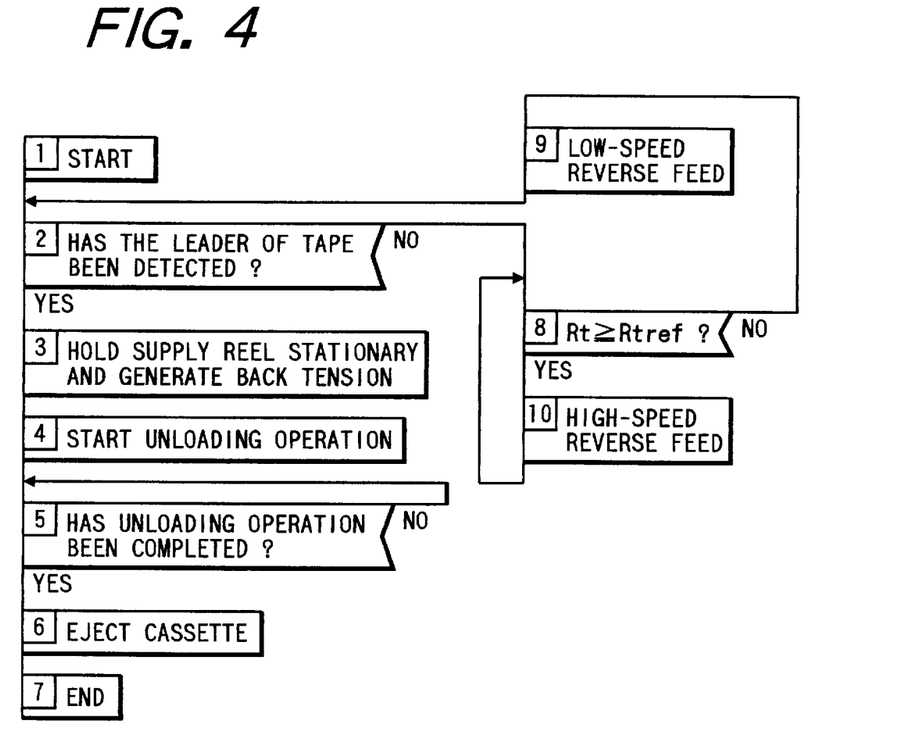
FIG. 4 is a flow chart of the operations of the tape feed control system of FIG. 1 and signal processing procedures (PAD diagram)

The foregoing control operations are carried out when the cassette 50 is loaded into the tape feed control system and the tape 1 is threaded into the tape feed control system. Operations for unloading the tape 1 when ejecting the cassette 50 from the tape feed control system will be described hereinafter. FIG. 4 shows a tape unloading procedure to be carried out by the tape feed control system of FIG. 1. In most cases, the tape 1 is rewound before unloading. In step 2 of FIG. 4, the leading end of the tape 1 is detected prior to the tape unloading operation. After the leading end of the tape 1 has been detected, steps 3 to 6 are executed. Operations in steps 8 to 10 are executed until the leading end of the tape 1 is detected. These operations are substantially similar to those in steps 8 to 16 of FIG. 3 and hence the detailed description thereof will be omitted. When unloading the tape 1, the operations in steps 9 to 12 of FIG. 3 are omitted because, in most cases, the data representing the working radii of the supply reel 2 and the take-up reel 3 and the total length of the tape 1 are known.

Referring again to FIG. 4, upon detection of the leading end of the tape 1, the supply reel 2 is stopped and the take-up reel 3 is controlled so as to generate a torque for applying a predetermined back tension to the tape 1. Then, the loading motor 33 is driven for reverse rotation to shift the guide rollers 42 and 45 and the guide pins 40, 43, 44 and 47 from their working positions to their retracted positions in the tape cassette, as indicated by the dotted arrows in FIG. 2, while taking up the thus slackened tape 1 using the take-up reel 3. Upon detection of the completion of the tape unloading operation by the loading completion detector 34, a cassette ejecting operation is started. In the tape unloading operation and the cassette ejecting operation, the length of the tape 1 necessary for the next loading of the tape 1 is wound on the take-up reel 3. Therefore, the working radius of the take-up reel 3 examined in step 3 of FIG. 3 enables step 15 and the following steps of FIG. 3 for the accurate calculation of the total length of the tape 1 to be quickly started in the next tape loading operation, which facilitates the tape loading operation.

The control of the rotation of the drum 6 provided with the magnetic heads 5 shown in FIG. 1, i.e., the control of the operation of the drum motor 19, will be briefly described. Referring to FIG. 1, a drum FG signal (DFG signal), i.e., a frequency signal proportional to the rotating speed of the drum 6, generated by the DFG sensor 16 and a drum phase signal (DPG signal) generated by the DPG sensor 17 and representing the phase of the drum 6, are supplied to the drum control circuit 18. The drum control circuit 18 determines the period of rotation of the drum 6 from the DFG signal, compares the period with a predetermined desired period, generates a speed error signal corresponding to the difference between the measured period and the desired period, compares the phase of the drum 6 represented by the DPG signal with a reference phase represented by a reference phase signal, and generates a phase error signal corresponding to the difference between the measured phase and the reference phase. The speed error signal and the phase error signal are added to obtain a control signal, which is used for the feedback control of the drum motor 19 to make the drum 6 rotate at a predetermined rotating speed with a correct phase.

As mentioned above, the take-up reel 3 is substantially empty and the working radius of the take-up reel is substantially equal to the radius of the hub thereof during the normal cassette loading operation and the normal cassette ejecting operation. Therefore, a back tension can be applied to the tape 1 during the tape loading operation by holding the supply reel 2 stationary, unwinding the tape 1 from only the take-up reel 3 and making the take-up reel 3 generate a fixed torque, so that the tape 1 can be prevented from being damaged during the tape loading operation. Since the working radius of the full supply reel 2 is calculated on the basis of the data representing respective rotating speeds of the supply reel 2 and the take-up reel 3 when the leading end of the tape 1 is detected, as well as the data representing the radius of the hub of the take-up reel 3, and the total length S of the tape 1 is calculated on the basis of the data representing the working radius of the supply reel 2 and the data representing the radius of the hub of the take-up reel 3, the total length S of the tape 1 can be accurately calculated, and hence the speed can be accurately detected.

The tape 1 is searched to determine the leading end during the tape loading operation and, if the leading end of the tape 1 has not been rewound from the take-up reel 3, the respective working radii of the supply reel 2 and the take-up reel 3 and the total length S of the tape 1 are calculated temporarily, and then a high-speed reverse feed operation is executed, which improves the operability of the tape feed control system.

Figure 5:
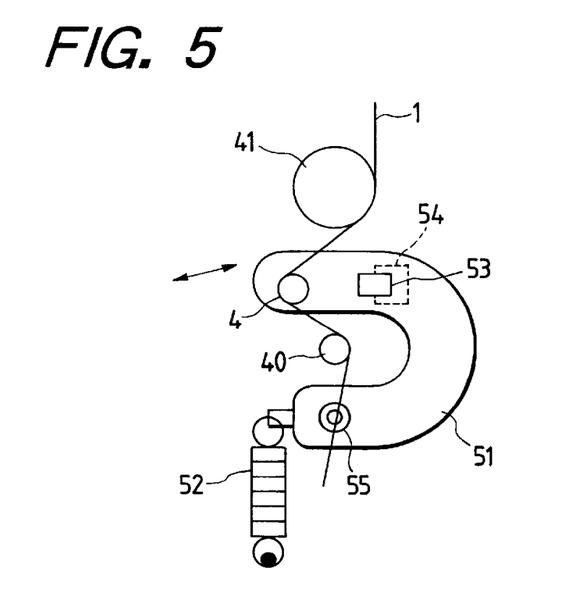
FIG. 5 is a diagrammatic view of a tape tension detector.

A tape feed control system in a second embodiment according to the present invention, capable of even more accurately calculating the total length S of the tape, will be described hereinafter. The performance of a tape tension detector is a factor that introduces errors in calculating the total length of the tape. A tension detector as shown in FIG. 5 is used prevalently. Shown in FIG. 5 are a tape 1, a tape tension pickup 4, a guide pin 40, a guide roller 41, a tension arm 51, a spring 52, a magnet 53, a magnetic detector 54, such as a magnetoresistance device or a Hall device, and a pivot shaft 55. A moment of rotation produced by the spring 52 connected to one end of the tension arm 51 and a moment of rotation produced by the tension of the tape 1 balance each other. The distance between the magnet 53 attached to the tension arm 51 and the magnetic detector 54 attached to a fixed part under the tension arm 51 varies according to the variation of the tension of the tape 1, and the magnetic detector 54 provides a tension signal representing the tension of the tape 1.

When the tension arm 51 turns on the pivot shaft 55 in response to a variation of the tension of the tape 1, the tape path length between the guide pin 40 and the guide roller 41 varies accordingly. The same problem, i.e. the variation of the tape path length according to the variation of the tension, arises even if a potentiometer is used for detecting the tension through the detection of the angular position of the tension arm 51 instead of the combination of the magnet 53 and the magnetic detector 54. The variation of the tape path length causes a difference between the length of the tape 1 taken up by the take-up reel and that of the tape 1 fed out by the supply reel. Since the expression (7) used for the accurate calculation of the working radius of the full supply reel necessary for the calculation of the total length of the tape 1 is based on an assumption that the length of the tape fed out by the supply reel is equal to the length of the tape taken up by the take-up reel, the working radius of the full supply reel calculated by using expression (7) includes an error as a matter of course when the length of the tape fed out and that of the tape taken up are different from each other. To put it differently, the length of the tape fed out by the supply reel and that of the tape taken up by the take-up reel must be exactly equal to each other for the accurate calculation of the working radius of the supply reel.

Figure 6:
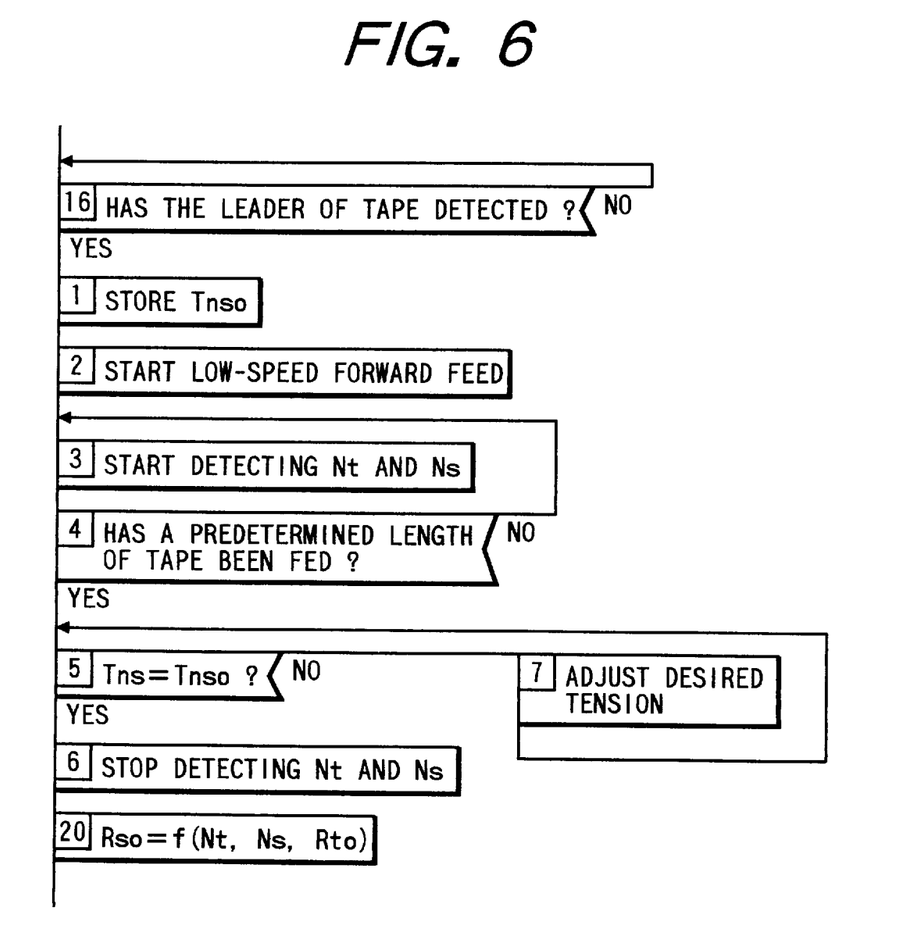
FIG. 6 is a flow chart of the operations of the tape feed control system of FIG. 1 and signal processing procedures (PAD diagram)

In the second embodiment, steps 1 to 7 of FIG. 6 are executed instead of steps 18 to 20 of FIG. 3 for the accurate calculation of the total length of the tape after the leading end of the tape has been pulled out from the take-up reel. Since the same output of the tension detector corresponds to the same tape path length, the tape tension controller 24 controls the tension of the tape so that the output of the tension detector at the start of measurement of the respective numbers of turns of the supply reel and the take-up reel and the end of the measurement of the same during the low-speed forward feed operation are equal to each other.

Referring to FIG. 6, in step 1, a tension $Tns_0$ detected by the tension detector 15 (FIG. 1) is transferred through the radius calculator 22 and is stored in the memory 23. In steps 2 and 3, a low-speed forward feed operation is started and a measurement of the respective numbers of turns of the supply reel and the take-up reel is started. Upon the detection of the feed of a predetermined length of the tape, the tension of the tape is detected and is compared with the tension $Tns_0$ stored in the memory 23, and the numbers of turns of the supply reel and the take-up reel at a moment when the tension coincides with the tension $Tns_0$ is recorded. When the tension does not coincide with the tension $Tns_0$, the desired tension for the tension controller 24 is changed slightly to adjust the tension to the tension $Tns_0$.

Thus, accurate data not including any error due to the variation of the tape path length, necessary for the accurate calculation of the working radius of the full supply reel and the total length of the tape, can be obtained in a state where the length of the tape fed out by the supply reel and that of the tape taken up by the take-up reel are equal to each other. Thus, even if the tape feed control system is provided with an ordinary tension detector in which the tape path length varies according to the variation of the tape tension, the working radius of the full supply reel and the total length of the tape can be accurately calculated and, consequently, accurate tape speed control and accurate tension control can be achieved.

A tape feed control system representing a third embodiment according to the present invention will be described hereinafter. This tape feed control system is capable of preventing damage to the tape in an unsteady state in which data representing the respective working radii of the supply reel and the take-up reel and/or the data representing the total length of the tape is lost due to, for example, an abnormal disconnection of the tape feed control system due to a power failure or an operator's faulty operation. If the tape unloading operation is started immediately after the reconnection of the tape feed control system to the power source, an appropriate back tension cannot be applied to the tape because the respective working radii of the supply reel and the take-up reel are unknown and, consequently, the possibility of damaging the tape during the unloading operation increases. The tape feed control system in the third embodiment does not execute the tape loading operation or the tape unloading operation when the data representing the respective working radii of the supply reel and the take-up reel or the data representing the total length of the tape is lost accidentally, but measures the respective working radii of the supply reel and the take-up reel and the total length of the tape.

Figure 7:
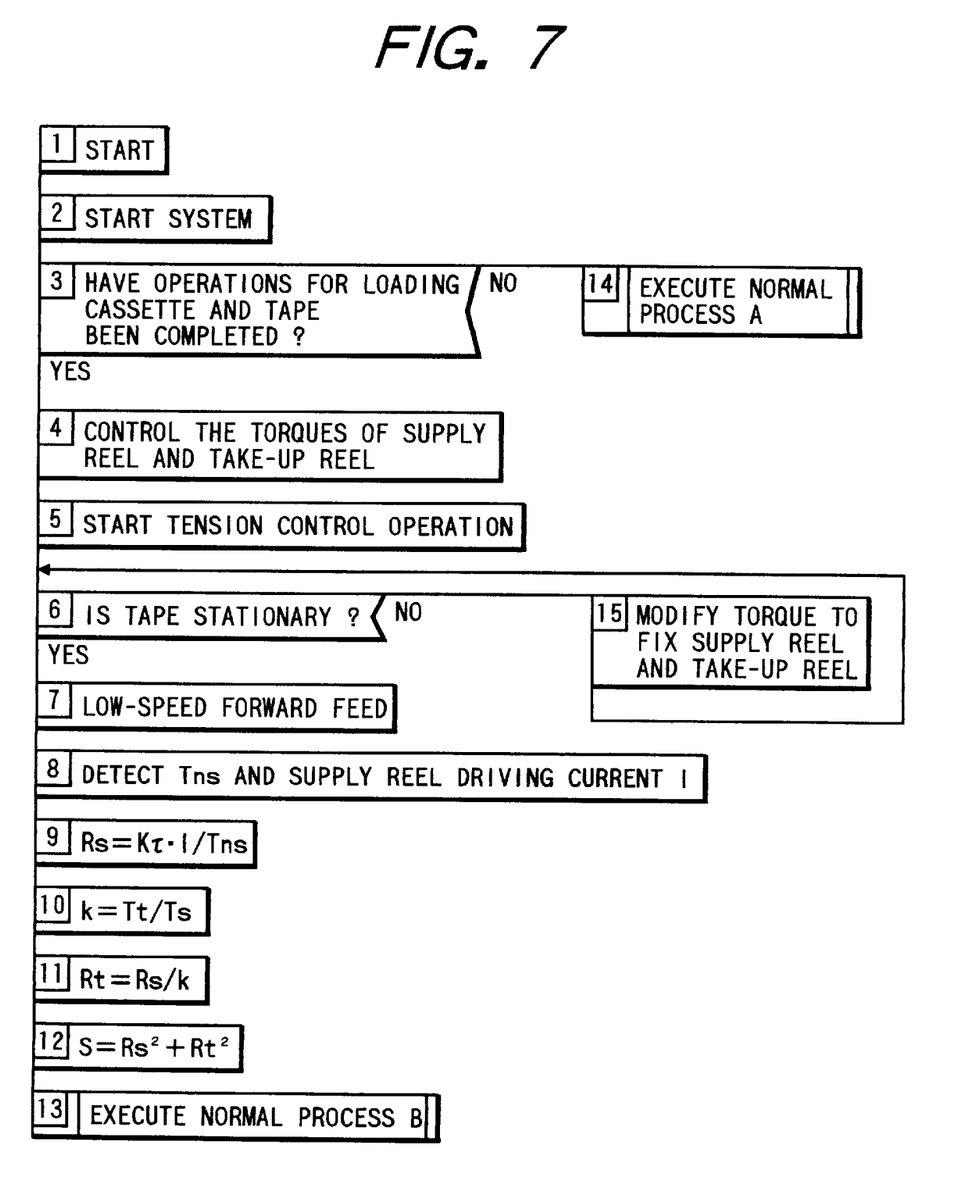
FIG. 7 is a flow chart of the operations of the tape feed control system of FIG. 1 and signal processing procedures (PAD diagram).

Referring to FIG. 7, which shows the operation of the tape feed control system in the third embodiment, the output of the loading completion detector 34 (FIG. 1) is examined by the system controller 31 in step 3 to see whether or not the loading operation for loading the tape cassette into the tape feed control system and for loading the tape has been completed. If the tape is not loaded or the tape cassette is not loaded into the tape feed control system, a normal process A is executed in step 14 corresponding to step 1 in FIG. 3. If the loading operation has been completed, step 4 and the following steps are executed. In step 4, the supply reel 2 and the take-up reel 3 are made to generate fixed torques in the winding direction to apply a moderate tension to the tape, and a tension feedback control system is actuated. Since the respective working radii of the supply reel 2 and the take-up reel 3 are unknown at this stage, the tensile force applied to the tape by the supply reel 2 and the tensile force applied to the tape by the take-up reel 3 do not necessarily balance each other and, some times, the tape moves. Therefore, the SFG signals indicating the rotating speed of the supply reel 2 and the TFG signal indicating the rotating speed of the take-up reel 3 are examined to see if the tape is stationary.

If the tape is moving due to unbalanced tensile forces acting on the tape in opposite directions, the respective torques of the supply reel 2 and the take-up reel 3 are adjusted to stop the tape because the tape may be damaged if the tape moves at this stage. When it is found from the SFG signal and the TFG signal that the tape is stationary, operations for calculating the respective working radii of the supply reel 2 and the take-up reel 3 and the total length of the tape are started. First, the tension of the tape and the current supplied to the supply reel motor 7 are determined from the respective outputs of the tension detector 15 and the current detector 26 (FIG. 1) to determine the working radius of the supply reel 2. The tension of the tape thus determined is measured at the tape tension pickup 4, and is different from the tension of the tape measured at a position near the supply reel 2. The ratio between the tensions of the tape measured at the tape tension pickup 4 and at the position near the supply reel 2 is a known design value dependent on the coefficient of friction between the tape and each of the guide pins, and the angle of contact between the tape and each of the guide pins. Therefore, the tension of the tape at the position near the supply reel 2 can be determined by correcting the tension measured at the tape tension pickup 4. Since the torque constant, i.e., current-torque conversion coefficient, of the supply reel motor 7 is known, the torque of the supply reel motor 7 is the product of the driving current supplied to the supply reel motor 7 and the torque constant. Therefore, the working radius Rs of the supply reel can be calculated by using:

$$Rs = \frac{K\tau \cdot I}{Tns} \tag{10}$$

where Tns is the tension of the tape at a position near the supply reel 2, I is driving current supplied to the supply reel motor 7, and Kτ is the torque constant of the supply reel motor 7.

Then, steps 10 to 12 of FIG. 7 are executed to determine the rotational period ratio between the supply reel 2 and the take-up reel 3 and to calculate the working radius Rt of the take-up reel 3 and the total length S of the tape. Then, a normal process B is executed in step 13 of FIG. 7. Step 13 corresponds to step 8 of FIG. 8.

Thus, when the data representing the respective working radii of the supply reel 2 and the take-up reel 3 or the data representing the total length of the tape is lost accidentally during the tape loading operation, the tape unloading operation without knowing the working radii of the supply reel and the take-up reel is inhibited, and the tape feed control system is quickly restored to its normal condition by quickly detecting the approximate working radii of the supply reel 2 and the take-up reel 3 and the approximate total length of the tape. Accordingly, the reliability in preventing damage to the tape and the ease of use are improved.

Although the invention has been described in terms of the functions of the hardware forming the tape feed control system, the tape feed control system need not necessarily be an assembly of those individual component parts, and the functions of those individual component parts may be replaced by software that is executed by a microcomputer having the functions of, for example, the component parts included in the area 36 demarcated by dotted lines in FIG. 1. Although the foregoing embodiments operate to hold the supply reel stationary in an entirely electrical feedback control mode during the loading operation or the unloading operation, the supply reel may be held stationary by a mechanical braking mechanism.

As is apparent from the foregoing description, the present invention provides an inexpensive tape feed control system to be incorporated into a data recorder provided with a helical-scan magnetic recording/reproducing system, which is capable of highly accurately controlling tape speed by using a supply reel and a take-up reel capable of operating in a wide tape speed range from a low tape speed to a high tape speed, which is reliable in preventing damage to the tape and which is satisfactory in operation, without employing a capstan driving system. First, the present invention is capable of quickly and accurately detecting the respective working radii of the supply reel and the take-up reel to accurately control tape speed. Secondly, the present invention is capable of preventing damage to the thin tape when feeding the thin tape, loading the thin tape and unloading the thin tape. Thirdly, the present invention is capable of protecting the tape and of quickly restoring the system to a normal condition when the tape feed control system is operated erroneously by the operator or when the tape feed control system is disconnected abnormally from the power source.

What is claimed is:

1. A tape feed control system for controlling feeding of a tape between a supply reel and a take-up reel, comprising:

a first reel winding radius calculating means for calculating reel winding radius information for at least one of said supply reel and said take-up reel;

a tape rewinding means for rewinding the tape to a leading portion of the tape using the reel winding radius information calculated by said first reel winding radius calculating means;

a second reel winding radius calculating means for calculating reel winding radius information for at least one of said supply reel and said take-up reel;

a total tape winding length calculating means for calculating a total winding length of the tape using the reel winding radius information calculated by said second reel winding radius calculating means;

a reel rotation ratio detecting means for detecting rotational ratio information, which includes at least one of a rotational period ratio and a rotational speed ratio, for said supply reel and said take-up reel; and a tape speed information calculating means for calculating tape speed information from said total winding length and said rotational ratio information, a tape loading completion detection means for detecting completion of a tape loading operation, wherein said first reel winding radius calculating means comprises:

a supply reel stopping means for stopping rotation of the supply reel when completion of the tape loading operation is detected;

a torque generating means for making the take-up reel generate a predetermined take-up torque when the completion of the tape loading operation is detected;

a tape loading means for winding the tape around a drum; and a first reel rotational angle detecting means for detecting rotational angle information of the take-up reel, wherein said first reel winding radius calculating means calculates a radius of the take-up reel from said rotational angle information of the take-up reel and data representing predetermined loading path length;

wherein said second reel winding radius calculating means comprises:

a tape feed means for feeding the tape from the leading portion of the tape by a first amount; and a second reel rotational angle detecting means for detecting rotational angle information of said supply reel and said take-up reel when the tape is fed by said first amount, wherein said second reel winding radius calculating means calculates reel winding radiuses for said supply reel and said take-up reel from said rotational angle information of the supply reel and the take-up reel derived from said second reel rotational angle detecting means and known reel hub radius information, said total tape winding length calculating means calculating said total winding length of the tape using said reel winding radiuses for said supply reel and said take-up reel, and wherein said tape speed information calculating means calculates said tape speed information using said total winding length calculated by said total tape winding length calculating means and the rotational ratio information for said supply reel and said take-up reel detected by said reel rotation ratio detecting means to feed the tape between said supply reel and said take-up reel at a constant speed.

2. A tape feed control system for controlling feeding of a tape between a supply reel and a take-up reel, comprising:

a tape loading completion detecting means for detecting completion of a tape loading operation;

a supply reel stopping means for stopping rotation of the supply reel at a time with respect to the tape loading operation;

a torque generating means for making the take-up reel generate a predetermined take-up torque at a time with respect to the tape loading operation;

a tape loading means for winding the tape around a drum;

a reel rotational angle detecting means for detecting angles of rotation of the supply reel and the take-up reel;

a reel radius calculating means for calculating a radius of the take-up reel from data representing the angle of rotation of the take-up reel detected by the reel rotational angle detecting means during a tape loading operation and data representing a predetermined loading path length;

a tape rewinding means for rewinding the tape at a substantially constant speed using at least the radius of the take-up reel;

a tape leading portion detecting means for detecting a leading portion of the tape;

a tape feed means for feeding a first length of the tape from the supply reel to the take-up reel after the leading portion of the tape has been detected;

a total tape length calculating means for calculating a total length of the tape on the basis of data representing angles of rotation of the supply reel and the take-up reel detected by the reel rotational angle detecting means when said first length of the tape is fed and data representing a radius of a hub of the take-up reel;

a reel rotational period detecting means for detecting rotational periods of the supply reel and the take-up reel during tape feeding;

a tape speed error detecting means for generating a tape speed error signal on the basis of a comparison between a detected tape speed, derived from data representing the total length of the tape and data representing said rotational periods of the supply reel and the take-up reel, and data representing a predetermined reference tape speed; and a reel driving means for controlling at least one reel motor based on said tape speed error signal, which is fed back to said reel driving means from said tape speed error detecting means in a feedback control mode.

3. A tape feed control system according to claim 2, wherein the time with respect to the tape loading operation for making the take-up reel generate a predetermined take-up torque by the torque generating means is the time of completion of the tape loading operation.

4. A tape feed control system for controlling feeding of a tape between a supply reel and a take-up reel, comprising:

a first reel winding radius calculating means for calculating reel winding radius information for at least one of said supply reel and said take-up reel;

a tape rewinding means for rewinding the tape to a leading portion of the tape using the reel winding radius information calculated by said first reel winding radius calculating means;

a second reel winding radius calculating means for calculating reel winding radius information for at least one of said supply reel and said take-up reel;

a total tape winding length calculating means for calculating a total winding length of the tape using the reel winding radius information calculated by said second reel winding radius calculating means;

a reel rotation ratio detecting means for detecting rotational ratio information, which includes at least one of a rotational period ratio and a rotational speed ratio, for said supply reel and said take-up reel; and a tape speed information calculating means for calculating tape speed information from said total winding length and said rotational ratio information, wherein said first reel winding radius calculating means comprises:

a reel stopping means for stopping rotation of the supply reel during a tape loading operation;

a tape loading means for winding the tape around a drum; and a first reel rotational angle detecting means for detecting rotational angle information of the take-up reel, wherein radiuses of the take-up reel and the supply reel are calculated from said rotational angle information of the take-up reel, said rotational ratio information of the supply reel and take-up reel, and data representing a predetermined loading path length, wherein said second reel winding radius calculating means comprises:

a tape feed means for feeding the tape from the leading portion of the tape by a first amount; and a second reel rotational angle detecting means for detecting rotational angle information of said supply reel and said take-up reel when the tape is fed by said first amount, wherein said second reel winding radius calculating means calculates reel winding radiuses for said supply reel and said take-up reel from said rotational angle information of the supply reel and the take-up reel derived from said second reel rotational angle detecting means and known reel hub radius information, said total tape winding length calculating means calculating said total winding length of the tape using said reel winding radiuses for said supply reel and said take-up reel, and wherein said tape speed information calculating means calculates said tape speed information using said total winding length calculated by said total tape winding length calculating means and the rotational ratio information for said supply reel and said take-up reel detected by said reel rotation ratio detecting means to feed the tape between said supply reel and said take-up reel at a constant speed.

5. A tape feed control system according to claim 4, further comprising:

a tape loading completion detecting means for detecting completion of a tape loading operation.

6. A tape feed control system according to claim 5, further comprising:

torque generating means for generating a predetermined torque in said take-up reel.

7. A tape feed control system for controlling feeding of a tape between a supply reel and a take-up reel, comprising:

a reel stopping means for stopping rotation of the supply reel during a tape loading operation;

a tape loading means for winding the tape around a drum;

a reel rotational angle detecting means for detecting angles of rotation of the supply reel and the take-up reel;

a two-reel radius calculating means for calculating a radius of the take-up reel from data representing an angle of rotation of the take-up reel detected by the reel rotational angle detecting means during a tape loading operation, rotational ratio information for said supply reel and said take-up reel, and data representing a predetermined loading path length;

a tape rewinding means for rewinding the tape at a substantially constant speed using at least the radius of the take-up reel;

a tape leading portion detecting means for detecting a leading portion of the tape;

a tape feed means for feeding a first length of the tape from the supply reel to the take-up reel after the leading portion of the tape has been detected;

a total tape length calculating means for calculating a total length of the tape on the basis of data representing angles of rotation of the supply reel and the take-up reel detected by the reel rotational angle detecting means when said first length of the tape is fed and data representing a radius of a hub of the take-up reel;

a reel rotational period detecting means for detecting rotational periods of the supply reel and the take-up reel during tape feeding;

a tape speed error detecting means for generating a tape speed error signal on the basis of a comparison between a detected tape speed, derived from data representing the total length of the tape and data representing said rotational periods of the supply reel and the take-up reel, and data representing a predetermined reference tape speed; and a reel driving means for controlling at least one reel motor based on said tape speed error signal, which is fed back to said reel driving means from said tape speed error detecting means in a feedback control mode.

8. A tape feed control system according to claim 7, further comprising:

a tape loading completion detecting means for detecting completion of a tape loading operation.

9. A recording and reproducing system for recording on and reproducing information from a tape having a fixed thickness wound on first and second reels, each having a fixed radius and being housed within a tape cassette, comprising:

a drum having a rotational head for recording information on the tape and for reproducing information from the tape;

a tape loading means for drawing the tape from the tape cassette to wind the tape around said drum and to form a fixed tape feed path;

a tape driving means for driving said pair of reels to feed the tape in a longitudinal direction, said tape driving means including two reel motors connected, respectively, to said reels;

a tape winding radius detecting means for detecting winding radius information of the tape wound around the supply reel;

a managing signal recording and reproducing means for recording or reproducing a managing signal for managing said information in the vicinity of an end of a leading side in a longitudinal direction of the tape; and a tape feed control means for controlling said tape driving means to apply a fixed tension to the tape and to feed the tape at a fixed speed, wherein:

when the tape cassette is mounted in a state where the tape is located in an intermediate portion of the overall length thereof, said tape winding radius detecting means detects the tape loading operation of said tape loading means and the first tape winding radius information, said tape feed control means uses said first winding radius information to feed in reverse the tape by the tape driving means to rewind the tape to a loading position thereof, after which the tape is normally fed;

said tape winding radius detecting means detects second tape winding radius information as well as said normal feed operation; and said tape feed control means uses said second winding radius information to control the tape feed by said tape driving means.

* * * * *